US012747831B2

(12) United States Patent
Ingleton et al.

(10) Patent No.: US 12,747,831 B2
(45) Date of Patent: Sep. 29, 2026

(54) HYDROGEN STORAGE AND DISTRIBUTION SYSTEM

(71) Applicant: GREENTECH HYDROGEN INNOVATIONS CORP., Vancouver (CA)

(72) Inventors: Curtis Ingleton, Vancouver (CA); Paul Dickson, Vancouver (CA)

(73) Assignee: GREENTECH HYDROGEN INNOVATIONS CORP., Vancouver (CA)

( * ) Notice: Subject to any disclaimer, the term of this patent is extended or adjusted under 35 U.S.C. 154(b) by 103 days.

(21) Appl. No.: 18/839,337

(22) PCT Filed: Feb. 16, 2023

(86) PCT No.: PCT/CA2023/050204
§ 371 (c)(1),
(2) Date: Aug. 16, 2024

(87) PCT Pub. No.: WO2023/155011
PCT Pub. Date: Aug. 24, 2023

(65) Prior Publication Data

US 2025/0155085 A1 May 15, 2025

Related U.S. Application Data

(60) Provisional application No. 63/311,910, filed on Feb. 18, 2022.

(51) Int. Cl.
*F17C 7/00* (2006.01)
*G06Q 10/083* (2024.01)
*G06Q 10/087* (2023.01)

(52) U.S. Cl.
CPC ......... *F17C 7/00* (2013.01); *G06Q 10/08355* (2013.01); *G06Q 10/087* (2013.01);
(Continued)

(58) Field of Classification Search
CPC .......... F17C 2265/065; F17C 2221/012; F17C 11/005; F17C 2221/033; F17C 2223/0123;
(Continued)

(56) References Cited

U.S. PATENT DOCUMENTS

2006/0229827 A1* 10/2006 Copeman .................. C01B 3/00 702/24
2009/0265292 A1* 10/2009 Harper ................... G06N 3/126 706/13
(Continued)

FOREIGN PATENT DOCUMENTS

CA 2864616 C 8/2013

OTHER PUBLICATIONS

International Search Report and Written Opinion, issued in corresponding PCT Application No. PCT/CA2023/050204, mailed May 3, 2023.

*Primary Examiner* — Florian M Zeender
*Assistant Examiner* — Vanessa Deligi
(74) *Attorney, Agent, or Firm* — Quarles & Brady LLP

(57) ABSTRACT

A storage and distribution method and system for a gaseous commodity such as hydrogen comprises a plurality of sensors for measuring quantity and purity of the gas produced, or that is stored or being delivered in vessels, and a gateway which communicates sensor data to a distribution system. The distribution system analyzes the data to determine the real time availability and available locations of gas of the desired purity, taking into consideration the sensor data, degradations, and the effects of dispensing, replenishing and mixing of supplies. The distribution system also provides delivery routing according to proximity and purity requirements.

9 Claims, 8 Drawing Sheets

(52) U.S. Cl.
CPC .. *F17C 2221/012* (2013.01); *F17C 2250/034* (2013.01); *F17C 2250/0417* (2013.01); *F17C 2250/043* (2013.01); *F17C 2250/0439* (2013.01); *F17C 2250/0443* (2013.01); *F17C 2250/0447* (2013.01); *F17C 2250/0694* (2013.01)

(58) Field of Classification Search
CPC ...... F17C 2223/0161; F17C 2270/0184; F17C 5/06; F17C 7/00; F17C 2250/034; F17C 2250/0417; F17C 2250/043; F17C 2250/0439; F17C 2250/0443; F17C 2250/0447; F17C 2250/0694; G06Q 30/06; G06Q 30/02; G06Q 10/04; G06Q 10/0639; G06Q 30/0278; G06Q 50/00; G06Q 10/20; G06Q 50/04; G06Q 10/063; G06Q 50/08; G06Q 10/063118; G06Q 10/087; G06Q 10/06316; G06Q 10/083; G06Q 10/0631; G06Q 10/103; G06Q 30/0283; G06Q 10/067; G06Q 10/08355; G06Q 30/0201; G06Q 30/0202; F17D 3/01; F17D 1/04; F17D 3/18
See application file for complete search history.

(56) References Cited

U.S. PATENT DOCUMENTS

| | | | | |
|---|---|---|---|---|
| 2014/0263401 | A1* | 9/2014 | McAlister | H01M 8/04425 222/23 |
| 2020/0240590 | A1 | 7/2020 | Ortiz | |
| 2021/0302348 | A1* | 9/2021 | Kim | G01N 17/04 |
| 2023/0259088 | A1* | 8/2023 | Borup | G05B 19/042 700/9 |
| 2023/0272883 | A1* | 8/2023 | Brutoco | F17D 3/18 48/190 |

* cited by examiner

HYDROGEN STORAGE AND DISTRIBUTION SYSTEM

CROSS REFERENCE TO RELATED APPLICATION

This application represents the U.S. national stage entry of International Application No. PCT/CA2023/050204 filed Feb. 16, 2023, which application claims priority to U.S. Provisional Application No. 63/311,910, filed Feb. 18, 2022, the disclosures of which is hereby incorporated by reference in their entireties.

FIELD OF THE INVENTION

This invention relates to the distribution of commodities and more particularly to the handling and distribution of gaseous products.

BACKGROUND OF THE INVENTION

Advances in the use of hydrogen fuel as a source of energy have enabled the reduction of greenhouse gas emissions from conventional fuels, including heavy fuel oil. However, the evolution of hydrogen technology has outpaced the development of infrastructure for storing and distributing hydrogen.

Hydrogen production is shifting from a centralized large-scale effort to localized small scale efforts. The cost of production and the lack of a distribution infrastructure present obstacles for those seeking to transition to hydrogen as an energy source.

Several industrial and commercial processes produce hydrogen as a waste product which is typically burned off. Capturing, storing and distributing this "waste" hydrogen could avoid such waste provided a suitable storage and distribution infrastructure is in place. Waste and water treatment, as well as various agricultural activities also produce "waste" hydrogen, the value of which is lost.

Typically, once hydrogen is produced it is stored in pressurized industrial cylinders. Once stored, hydrogen may never be fully drained from the cylinders due to pressure equalisation which results in lost product. Storage of hydrogen has its nuances which have largely been addressed at the local level but nothing has been devised to manage the gas as stored energy to be distributed beyond the smaller local producer or user.

Techniques such as liquefaction exist to transport large amounts of hydrogen but they are cost-prohibitive for smaller scale consumers. Hydrogen used as fuel for transportation offers its unique challenges since selling hydrogen directly to the transportation fleet is uneconomic largely due to the lack of distribution.

Hydrogen is also moderately susceptible to contamination via the materials it comes into contact with along the supply chain. Oil compressors, tank residues, "creep" impurities from microscopic container ruptures and more all contribute to the overall purity of the gas. Purity, the presence of impurities, temperature, pressure, humidity and other factors present challenges to the control of the quality of the product and the ability to meet specific user needs or expectations. Hydrogen must be in the right place, time, pressure, purity and quantity for it to be usable to a given consumer.

Hydrogen monitoring apparatus used to determine the quantity, quality, and environmental conditions of hydrogen within a storage vessel is known. U.S. Pat. No. 9,450,258 discloses apparatus for controlling the concentration of hydrogen in a fuel cell system to maintain the concentration within a hydrogen device. U.S. Pat. No. 8,273,229 discloses a hydrogen sensor for measuring the hydrogen content in a storage vessel. U.S. Pat. Nos. 8,575,770 and 7,911,071 disclose hydrogen power distribution systems that control wind power-generated hydrogen to be distributed and transported to hydrogen filling stations. US Patent Publication No. 2022/0014592 discloses the use of networked sensors in various remote sensor data to a server.

Accordingly, there is a general need for improved methods and systems of storing and distributing gases such as hydrogen to address one or more of these challenges. It is a further objective of the invention to minimize the risk that gas producers, storers and users will run out of gas and to make any ageing or excess hydrogen available for distribution.

SUMMARY OF THE INVENTION

The invention is a platform, system and method of storing and distributing hydrogen or other gaseous commodities in a manner that responds to the specific quality and quantity requirements of gas consumers and to the diversity of available sources of hydrogen. The invention monitors or derives the parameters that characterize such quality and quantity thereby enabling the aggregation of supplies from various sources and their distribution to various consumers that remains responsive to the quantity and quality demand from specific consumers.

In one aspect, the invention comprises a distributed hydrogen inventory monitoring and distribution system for real-time monitoring of a plurality of hydrogen storage vessels and/or hydrogen production units, a plurality of communication gateways, a database containing records characterizing the sources of hydrogen which may include local hydrogen needs associated with each vessel/production unit, and a logistics database. It may also include means of assessing vessel integrity and longevity and a platform through which hydrogen trade is facilitated In an embodiment, the system monitors both the quantity and quality of hydrogen in a plurality of vessels at disparate locations. The system then reports such data to a database which represents the aggregated production in a geographic area. The needs of consumers are determined by sensor data and/or usage data and the system coordinates supply from the most appropriate hydrogen source based on its purity and distance from the consumer. As a result, the system maintains minimum hydrogen inventory while arranging the distribution network between suppliers and consumers.

In another aspect, through the use of sensors and suitable parametric data analysis the invention assesses or estimates the quantity and quality of hydrogen available in the participating storage vessels, determines or estimates the variations that occur in quantity and quality upon dispensing or replenishing product from storage and delivery vessels, and enables the efficient routing and replenishment protocols to effect quality control and to minimize travel distances.

In a particular aspect, the invention is a distributed monitoring and distribution system for a gas comprising:

at least one sensor associated with each of a plurality of gas storage vessels, at least some of said gas storage vessels being at remote locations in relation to others of said gas storage vessels;

each of said at least one sensor providing an output consisting of a real-time metric for the quantity of hydrogen in a gas storage vessel associated with said sensor using three metrics: volume, mass, and density.

The volume of a gas is measured by determining the amount of space it occupies, which is known through the relationship between vessel capacity and pressure. The mass of a gas is measured by determining the amount of matter it contains, which is accomplished during transfer of gas. Finally, the density of a gas is calculated by dividing its mass by its volume, yielding a measure of the mass per unit volume of the gas. These three metrics are used in combination to provide a comprehensive understanding of the quantity of a gas and are correlated through the measurement of temperature and pressure conditions.

a plurality of communication gateways for collecting data from said sensors and transmitting said data to a server;

a database associated with said server, said database containing records characterizing, for each of said storage vessels:

the location of said storage vessel;

the gas needs of an owner associated with said storage vessel;

the quantity of gas available in said storage vessel;

a demand database containing data characterizing the gas requirements of a plurality of consumers of gas;

a gas availability engine for deriving the quantity and quality of gas available from each of said storage vessels as a function of at least one of the following factors:

capacity of the storage vessel, a record of gas draws from said storage vessel, a gas degradation look up table or formula, real-time data supplied by a sensor associated with said storage vessel.

The database may contain records characterizing, for each of said storage vessels, the quality of gas available in said storage vessel. The quality of the gas is defined as a broader concept than purity, as it encompasses factors such as reactivity and other properties that may affect the suitability of the gas for a particular application. The invention receives the sensor's output and provides a real-time assessment of the purity (optionally) and quality of the stored gas. By monitoring both the purity and quality of the stored gas, the system and method of the present invention can ensure that the gas meets the required specifications and is of the highest possible quality for the intended use.

The demand database may contain data characterizing the location of said plurality of consumers.

The system may further include a prediction engine for predicting the future hydrogen needs and the future hydrogen availability associated with a given storage vessel. It may further include a prediction engine for calculating changes in quantity or quality of stored hydrogen as a function of dispensing or replenishing hydrogen from particular vessels or a plurality of vessels. It may also comprise a tank quality engine for determining the integrity of a storage vessel based on sensor data collected from impurities and from said vessel.

In another aspect the invention is a system for intelligent storage and distribution of hydrogen comprising:

a monitoring system for storage tanks;

a data aggregation system for aggregating data from multiple tanks;

a cloud-based back end for receiving real time sensor data and for estimating hydrogen production and demand data by performing one or more of the following:

i. real-time characterization of storage levels based on sensor data;

ii. real-time characterization of storage vessel conditions based on sensor data and indices for hydrogen purity and/or tank decay;

iii. real-time estimation of consumer demand for consumers participating in the system;

iv. projecting future consumer demand over given periods of time relying on algorithmically refined historical data or by a model trained on such data;

v. producing recommendations for producers based on anticipated consumer demand;

vi. communication of routing and transport decisions;

vii. setting real-time demand pricing;

d. A front-end user interface that allows end users to interact with the system.

In one embodiment, the hydrogen distribution system may allow consumers, in exchange for a price premium, to elect a higher priority in an order of distribution, and the system may process requests for hydrogen accordingly.

In an embodiment, the monitoring system may monitor production equipment, providing real time performance and production data.

The monitoring system may be installed on consuming vehicles providing real time consumption data and making refueling recommendations/requests for replenishment to fueling station based on expected vehicle service quantity.

According to another aspect, the invention is a monitoring and distribution system for a gas. The monitoring and distribution system comprises at least one sensor associated with each of a plurality of gas storage vessels, at least some of the gas storage vessels being at remote locations in relation to others of the gas storage vessels, each of the at least one sensor providing an output consisting of a real-time metric for the quantity of hydrogen in a gas storage vessel associated with the sensor, a plurality of communication gateways for collecting data from the sensors and transmitting the data to a server, a database associated with the server, the database containing records characterizing, for each of the storage vessel, the location of the storage vessel, the gas needs of an owner associated with the storage vessel, the quantity of gas available in the storage vessel, the database further containing data characterizing the gas requirements of a plurality of consumers of gas, a gas availability engine for deriving the quantity and quality of gas available from each of the storage vessels as a function of at least one of the following factors: capacity of the storage vessel, a record of gas draws from the storage vessel, a gas degradation look up table or formula, and real-time data supplied by a sensor associated with the storage vessel.

According to a further aspect, the database contains records characterizing, for each of the storage vessels, the quality of gas available in the storage vessel.

According to a further aspect, the demand database contains data characterizing the location of the plurality of consumers.

According to a further aspect, the system includes a prediction engine for predicting the future hydrogen needs and the future hydrogen availability associated with a given storage vessel.

According to a further aspect, the system includes a prediction engine for calculating changes in quantity or quality of stored hydrogen as a function of dispensing or replenishing hydrogen from particular vessels or a plurality of vessels.

According to a further aspect, the system includes a tank quality engine for determining the integrity of a storage vessel based on sensor data collected from impurities and from the vessel.

According to another aspect, the invention is a method of distributing a gas. The method comprises monitoring, via a plurality of sensor suites, each sensor suite of the plurality of sensor suites associated with a respective tank of a plurality of tanks containing the gas, a quantity of the gas in each tank of the plurality of tanks and a purity of the gas in each tank of the plurality of tanks, receiving, via a distribution system, from a first party at a first location a first request for a first quantity of the gas at a first purity, receiving, via the distribution system, from a second party at a second location a second request for a second quantity of the gas at a second purity, wherein the second purity is less than the first purity, communicating the first and second request from the distribution system to a transportation module, transferring a third quantity of the gas into the transportation module from a combination of one or more of the plurality of tanks so that a third purity of the third quantity of the gas is calculated or measured to be at least equivalent to the first purity, wherein the third quantity is at least equivalent to a combination of the first quantity and the second quantity, delivering, via the transportation module, the first quantity of the gas at the first purity to the first party from the third quantity of the gas, measuring, or calculating via the distribution system, a fourth quantity of the gas remaining in the transportation module and a fourth purity of the gas remaining in the transportation module, if the fourth quantity of the gas is greater than or equal to the second quantity of the gas and if the fourth purity of the gas is greater than or equal to the second purity of the gas, delivering, via the transportation module, the second quantity of the gas the second party from the fourth quantity of the gas.

According to a further aspect, the method comprises, if the fourth quantity of the gas is less than the second quantity of the gas or if the fourth purity of the gas is less than the second purity of the gas, calculating, via the distribution system, a fifth quantity and fifth purity of the gas required to be added to the fourth quantity and fourth purity of gas in a given storage vessel so as to result in a six quantity and a sixth purity that are greater than or equal to the second quantity and second purity, identifying, via the distribution system and the sensor suite, one of the plurality of storage tanks containing the fifth quantity and fifth purity of the gas, transferring the fifth quantity and fifth purity of the gas from the one of the plurality of storage tanks into the transportation module, transporting, via the transportation module, the sixth quantity of the gas to the second location.

According to a further aspect, the method comprises, before or during transporting the third quantity of the gas to the first location: receiving, via the distribution system, from a third party at a third location a third request for a fifth quantity of the gas at a fifth purity, wherein the fifth purity is less than or equal to the third purity and greater than the first purity, rerouting the transportation module to the third location, and delivering, via the transportation module, the fifth quantity of the gas at the fifth purity to the third party, whereupon following the delivering the transportation module contains a sixth quantity of the gas at a sixth purity, wherein the sixth quantity of the gas is at least equivalent to the first quantity of gas and wherein the sixth purity of the gas is at least equivalent to the first purity.

According to a further aspect, the transportation module is a first transportation module and wherein, if the sixth quantity of gas is less than the third quantity of gas, the method comprises, communicating the second request from the distribution system to a second transportation module, transferring a seventh quantity of the gas into the second transportation module from a combination of one or more of the plurality of tanks so that a seventh purity of the seventh quantity of the gas is at least equivalent to the second purity, wherein the seventh quantity is at least equivalent to the second quantity, transporting, via the second transportation module, the seventh quantity of the gas to the second location, and delivering, via the transportation module, the second quantity of the gas to the second party from the seventh quantity of the gas.

According to a further aspect, at least one of the plurality of tanks is located at a fourth location and wherein other ones of the plurality of tanks are located at one or more fifth locations, and transferring the third quantity of the gas into the transportation module comprises receiving a first portion of the third quantity of gas into the transportation module from the tank at the fourth location, transporting, via the transportation the first portion to the fifth locations to receive a remainder of the third quantity of the gas from the other ones of the tanks.

According to a further aspect, the method comprises receiving via the distribution system, over a period of time, a plurality of prior requests from the first user, each prior request including a respective quantity and purity of the gas, calculating, via the distribution system, a predicted request from first user based on the plurality of prior requests, the predicted request including a predicted quantity of the gas at a predicted purity, identifying, via the distribution system, one of the plurality of storage tanks containing the predicted quantity of the gas at the predicted purity at a fifth location, the fifth location proximate to the first location, transferring the predicted quantity of the gas into the transportation module, transporting and delivering, via the transportation module, the predicted quantity of the gas to the first party.

According to a further aspect, the gas is hydrogen.

According to a further aspect, each sensor suite comprises one or more sensors selected from the group consisting of hygrometers, thermometers, mass flow sensors, spectrometers, gas chromatographs, oxygen sensors, pressure sensors, and GPS sensors.

According to another aspect the invention is a method of distributing a gas. The method comprises recording over time, via a first sensor suite, sensor data representing a first purity of the gas stored in a first storage facility at a first location as a first series of data, recording over time, via a second sensor suite, sensor data representing a second purity of the gas stored in a second storage facility at a second location as a second series of data, wherein the first purity and the second purity are not equal, communicating, via a communications gateway, the first and second series of data to a distribution system, receiving, via the distribution system, a request from a consumer party for a first quantity of the gas at a third purity, wherein the third purity is not equal to the first purity or the second purity, calculating, via the distribution system, a second quantity of the gas at the first purity and a third quantity of the gas at the second purity that when combined are equal to the first quantity at the first purity, routing, via the distribution system, a transportation vessel to the first storage location, transferring the second quantity of the gas at the first purity into the transportation vessel from the first storage facility, routing, via the distribution system, the transportation vessel from the first storage facility to the second storage facility, transferring the third quantity of the gas at the second purity into the transportation vessel from the second storage facility, thereby combining the second quantity and the third quantity of the gas in the transportation vessel, routing, via the distribution system, the transportation vessel from the second storage facility to the consumer, and delivering the first quantity of the gas at the third purity to the consumer.

According to a further aspect, the step of calculating includes calculating, via the distribution system, a purity degradation rate of the gas based on sequential decreases in the first purity in the first series of data and in the second purity in the second series of data, calculating, via the distribution system a first travel time between the first storage facility and the second storage facility based on a distance between the first and second storage facilities, and a second travel time between the second storage facility and the consumer based on a distance between the second storage facility and the consumer, calculating, via the distribution system, a transit degradation purity amount based on the purity degradation rate and the first and second travel times, and calculating, via the distribution system, the second quantity of the gas at the first purity and the third quantity of the gas at the second purity that when combined and are equal to the first quantity at the first purity plus the transit degradation purity amount.

According to a further aspect, the transportation vessel contains an initial quantity of the gas at an initial purity, and the step of calculating includes calculating, via the distribution system, the second quantity of the gas at the first purity and the third quantity of the gas at the second purity that when combined with the initial quantity of the gas at the initial purity are equal to the first quantity at the first purity.

According to a further aspect, the transportation vessel begins at an initial location and routing the transportation includes calculating, via the distribution system, travel distances between each of the initial location, the first location, the second location, and the consumer, and providing a route to the transportation vessel having a shortest possible distance based on the travel distances from the initial location to the consumer and passing through both the first location and the second location.

According to a further aspect, the method comprises, when the transportation vessel is located at the consumer, measuring, via a consumer sensor suite, a final purity of the gas in the transportation vessel and communicating the final purity to the distribution system, and calculating, via the distribution system, a transport vessel purity degradation rate for the transportation vessel based on the second purity, the final purity, and a travel time from the second storage facility to the consumer.

According to a further aspect, for subsequent iterations of the method the step of calculating includes calculating, via the distribution system, the second quantity of the gas at the first purity and the third quantity of the gas at the second purity that when combined are equal to the first quantity at the first purity plus a transport vessel-specific degradation amount calculated as the transport vessel purity degradation rate multiplied by a distance between the second storage facility and the consumer.

According to a further aspect, the method comprises, when the transportation vessel is at the second storage facility, measuring, via the second sensor suite, an intermediate purity of the gas contained in the transportation vessel, recalculating, via the distribution system, the third quantity of the gas at the second purity that when combined with the first quantity of gas at the intermediate purity is equal to the first quantity of gas at the third purity, transferring the recalculated third quantity of the gas at the second purity into the transportation vessel from the second storage facility.

According to a further aspect, the gas is hydrogen.

According to a further aspect, each sensor suite comprises one or more sensors selected from the group consisting of hygrometers, thermometers, mass flow sensors, spectrometers, gas chromatographs, oxygen sensors, pressure sensors, and GPS sensors.

According to another aspect, the invention comprises a system for storage and distribution of a gas. The system comprises a first tank management system associated with a first set of one or more storage tanks at a first location, the first tank management system comprising, one or more first quantity sensors, each first quantity sensor configured to measure a quantity of the gas in respective ones of the first set of one or more storage tanks, one or more second purity sensors, each purity sensor configured to measure a purity of the gas in respective ones of the first set of one or more storage tanks, a first data aggregation and communication gateway in communication with the first tank management system, the first gateway configured to aggregate sensor data from the first tank management system as a first series of time-separated packets, a second tank management system associated with a second set of one or more storage tanks at a second location, the second tank management system comprising one or more second quantity sensors, each second quantity sensor configured to measure a quantity of the gas in respective ones of the second set of one or more storage tanks, one or more second purity sensors, each second purity sensor configured to measure a purity of the gas in respective ones of the second set of one or more storage tanks, a second gateway in communication with the second tank management system, the second gateway configured to aggregate sensor data from the second tank management system as a second series of time-separated packets, a distribution system in communication with the first and second gateways, the distribution system configured to receive and store the first and second series of packets in a database, the DOS further configured to perform the following using the first and second series of packets: calculate in real time current amounts and current purities of the gas stored in the first and second set of storage tanks, and in response to a request for a transfer of a given quantity and purity of the gas to the second set of storage tanks, if the given quantity and purity of the gas is available in the first set of storage tanks, direct via a transportation subsystem removal of the given quantity and purity of the gas from the first set of storage tanks and deliver to the second set of storage tanks.

According to a further aspect, the distribution system is configured to calculate a purity degradation rate for the gas stored in the first and second set of storage tanks according to a gas degradation curve.

According to a further aspect, the distribution system is configured to calculate in real time a decay condition of the first and second set of storage tanks.

Further aspects and example embodiments are illustrated in the accompanying drawings and/or described in the following description.

DETAILED DESCRIPTION OF THE PREFERRED AND OTHER EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

The platform, system and methods of the invention support the distribution between multiple producers or storers of hydrogen and multiple consumers, while providing a resilient hydrogen supply readily available to consumers.

Figure 1:
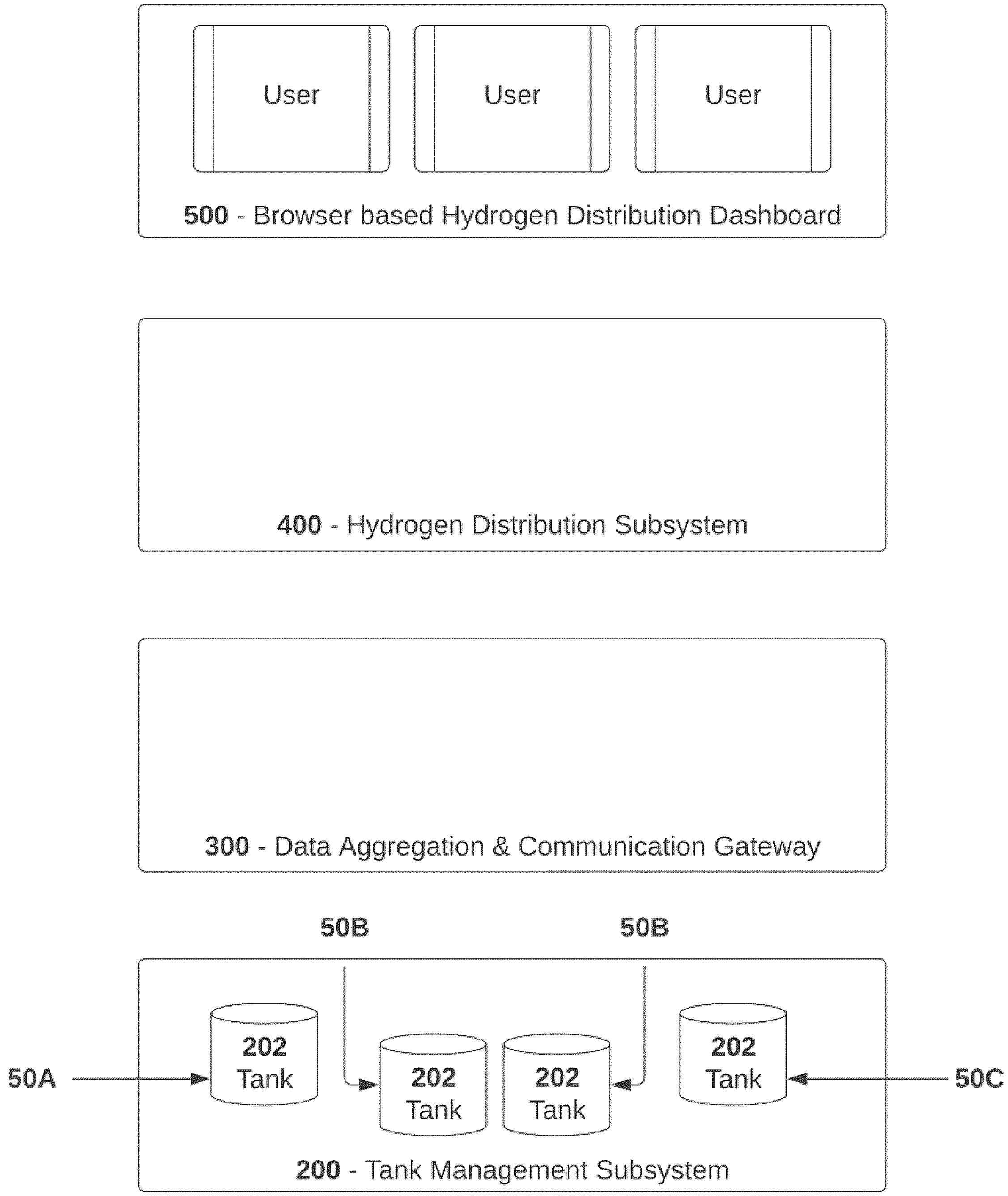
FIG. 1 is a schematic diagram of a hydrogen storage and distribution system according to a preferred embodiment of the invention, showing layers of sub-systems within the storage and distribution system.

Referring to FIG. 1, the preferred embodiment comprises four principal subsystems: a tank management sub-system 200, a data aggregation and communication gateway 300, a hydrogen distribution sub-system 400 and a hydrogen distribution dashboard 500.

Although systems and methods described herein are directed towards hydrogen as a commodity gas, the skilled person will recognize that these systems and methods can also be practiced in respect of other commercially valuable gases. Non-limiting examples of such gases include ammonia, gaseous hydrocarbons and hydrocarbon mixtures such as methane and natural gas, and the like.

FIG. 1 shows a schematic diagram of the platform 100 comprising a Tank Management Sub-System (TMS) 200 in communication with a data aggregation and communication gateway (DACG) 300. Gateway 300 communicates with a Hydrogen Distribution Sub-System (HDOS) 400. Users of HDOS 400 access HDOS 400 via a hydrogen distribution dashboard 500.

Information from one or more sensor clusters 202 each associated with one or more hydrogen storage tanks 50 at the TMS 200 flow through the gateway 300 and the HDOS 400 to the dashboard 500. Storage tanks 50 may include tanks on transport vehicles 50A, consumer storage tanks 50B (e.g. tanks located at a hydrogen fuel cell vehicle refilling station), and storage tanks at production facilities 50C. Preferably only limited data is processed at the gateway 300 which serves primarily as a relay for data back and forth between the HDOS 400 and TMS 200. The TMS 200 and gateway 300 are preferably locally situated at the site of production or consumption and the HDOS 400 is preferably hosted on a remote server. The dashboard 500 is an API driven interface which offers up user-centric information rendered by the HDOS 400 based on the user role in the supply chain.

In some embodiments, gateway 300 receives data from tank management sub-system 200 representative of the conditions of the hydrogen stored in storage tanks 50 (as sensed by sensor cluster 202). The data communicated from tank management sub-system 200 will preferably represent at least the quantity and purity of the hydrogen stored in storage tanks 50 as well as the location of each of the storage tanks 50. Gateway 300 aggregates the data from tank management system 200 and communicates the aggregated data on a periodic or continuous basis to the centralized distribution sub-system 400. Aggregated data may be communicated and stored as time-separated ledger entries on a blockchain. Distribution sub-system 400 analyzes changes in the aggregated data over time to calculate various information regarding the hydrogen stored in storage tanks 50 across the system, including but not limited to, total quantity and purity representative of the supply of hydrogen available, degradation rate of hydrogen stored representative of decreases in purity over time, and demand for stored hydrogen related to decreases in quantity over time. This information is presented to stakeholders in the system via distribution dashboard 500.

Distribution dashboard 500 and distribution sub-system 400 also facilitates transactions representing transfers of hydrogen between storage tanks 50 or out of the system. A hydrogen consumer can request a certain quantity and purity of hydrogen via dashboard 500. This request is communicated to the distribution sub-system 400. Based on aggregated data stored in distribution sub-system 400, distribution sub-system 400 identifies storage tanks 50 in proximity to the hydrogen consumer containing the requisite quantity and purity of hydrogen, and facilitates transfer of the hydrogen from said storage tank to the consumer via a transportation vessel (e.g. a hydrogen transport truck). In some embodiments, distribution system 400 can generate purchase orders, bills of lading, invoices, and the like to facilitate the transfer commercially. Repeat requests from various consumers allows distribution system 400 to forecast demand and automatically schedule transfers based on historical data for just-in-time fulfillment of consumer's needs.

Example embodiments of each of the subsystems will now be described in further detail.

Figure 2:
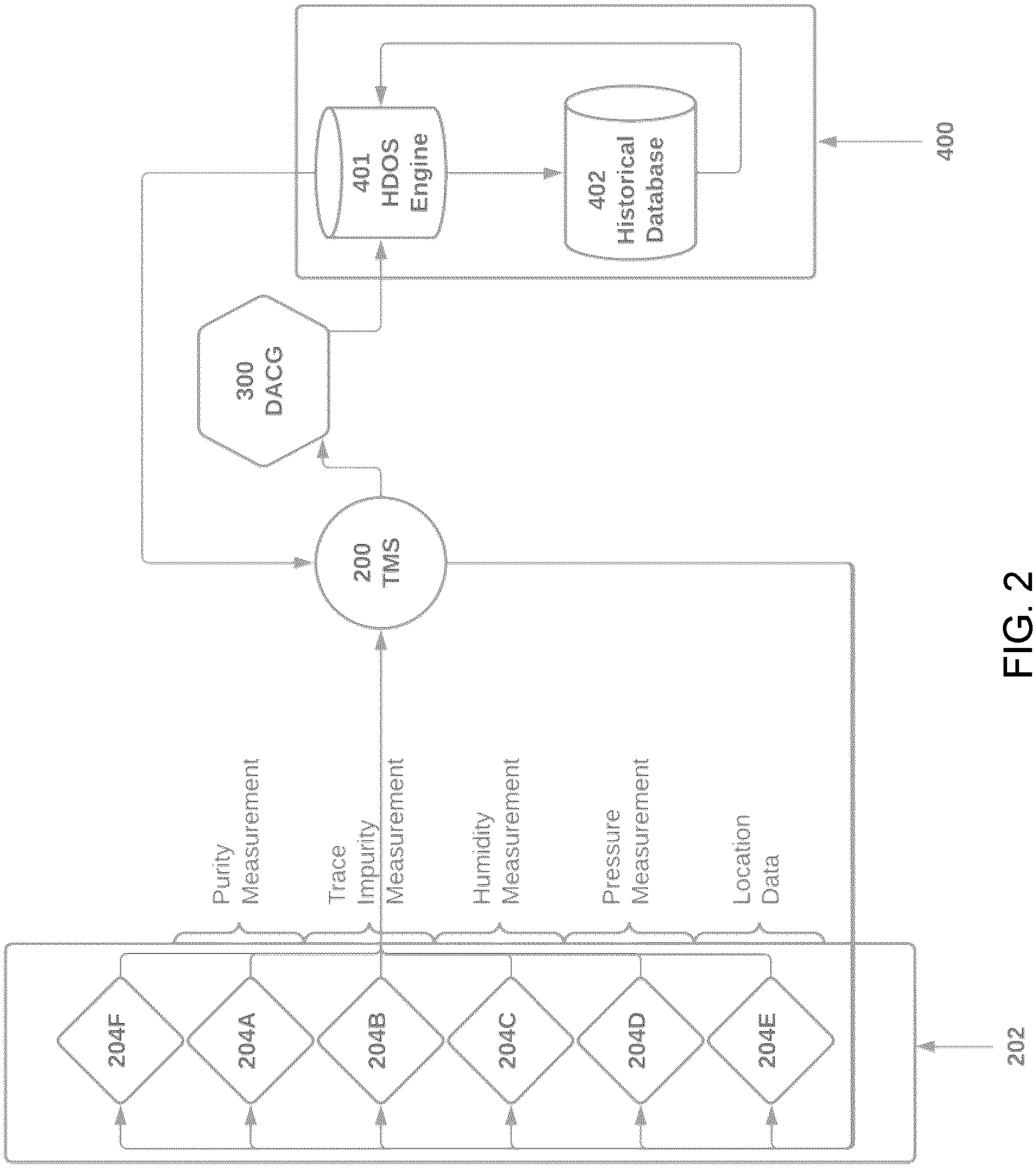
FIG. 2 is a schematic diagram of a tank management sub-system.

FIG. 2 shows a schematic diagram of tank management sub-system ("TMS") 200 which is used to maintain useable hydrogen. TMS 200 comprises sensor cluster 202 associated with a particular storage tank 50 (not shown in FIG. 3) and preferably one or more microcontrollers. Sensor cluster 202 monitors the conditions within the storage tank 50 and the microcontrollers communicate those conditions to the gateway 300. In some embodiments storage tank 50 is situated on site at a hydrogen producer, such as a gasification or electrolysis plant. In some embodiments, storage tank 50 is situated on site at a hydrogen consumer, such as a vehicle fuel cell refilling station. In some embodiments, storage tank 50 is a mobile transportation vessel, such as on a transport truck or in a ship.

The sensor cluster 202 comprises one or more sensors 204, such as sensors 204A, 204B, 204C, 204D, 204E, 204F. Sensors 204 may be selected from the group consisting of hygrometers, thermometers, mass flow sensors, oxygen sensors, pressure sensors and GPS sensors. Preferably, sensors 204 include hydrogen purity analyzers and trace impurity analyzers (e.g. spectrometers, gas chromatographs) to allow for the detection of small amounts of oxygen and other impurities present in the stored hydrogen. Based on the sensed amounts of oxygen or other impurities, the one or more microcontrollers can alert supply chain operators of potential leaks in the storage tank 50. This provides early warning before the level of oxygen poses a risk of an explosion. The sensor cluster 202 is preferably independently powered and communicates wirelessly with the HDOS 400 through the gateway 300.

Sensors 204 are arranged about the tank according to the geometry of the tank and the ancillary equipment fitted to it. A combination of in-tank sensors and in-line sensors may be used.

Sensor 204A may be a purity analyzer. The purity of hydrogen is important and is assessed at numerous points along the supply chain to ensure that hydrogen of the correct purity is delivered. Hydrogen is measured in "nines purity" and the sensors 204A equipped in the TMS 200 are preferably sensitive to a minimum of "five nines purity" or 99.999% purity. Currently fuel cells used in transportation require 99.999% purity with very strict and very low permitted contaminates (ISO 14687). As hydrogen is added and removed from the tank 50 it affects the net purity of the remaining hydrogen in the vessel 50. The quality and quantity of gas in the tank 50 is reassessed and a data packet is made to time stamp the addition/subtraction to the tank 50. The HDOS 400 uses this information to calculate the value of what remains in the tank 50 and may relay to the producer a recommendation for eventual marketing at a suitable price. Hydrogen purity is analyzed by the HDOS 400 to produce hydrogen degradation data for installations without purity analyzers. By collecting purity and other data (e.g. tank composition, tank age, other goods carried, number of draws of gas and number of deposits) a database is populated to assist in predicting and evaluating purity in cases where direct data from sensors is not available.

Sensor 2 (204B) Trace Impurity Analyzers

Sensor suite 202 may include a trace impurity analyzer 204B for detecting trace quantities of other substances mixed with the hydrogen in storage tank 50. Such substances may include oxygen as well as other contaminants such as hydrocarbons, hydrogen sulfide, and the like. The impurities present in a storage tank 50 are preferably also monitored for reasons of reactivity and as a qualifier for purity readings. Monitoring the presence of oxygen safeguards against combustion. TMS 200 is optionally equipped to raise the alarm to stakeholders when reactive thresholds are approached. Hydrogen embrittlement is another active concern as the mere storage of the gas causes a degradation in the storage tank 50. Even oil accumulated through the use of compressors may cause problematic impurities. The HDOS 400 takes the impurity readings from the analyzers 204B and projects a number of metrics such as the time when embrittlement will influence the hydrogen stored in the tank 50, when service is recommended on the tank 50 and the expected longevity of the tank 50. The types of impurities are reported and recorded allowing for the training of predictive models. The nature and concentration of trace impurities aids in calculation of the quality of the hydrogen in storage tank 50. If the hydrogen contained in storage tank 50 has high purity but contains trace amounts of a highly corrosive substance, it may be considered low quality and not suitable for all purposes despite the high purity. Where direct data is not collected, the collected hydrogen degradation data is leveraged to predict sources of impurity and other figures such as vessel longevity.

Sensor 3 (204C) Hygrometers

Sensor cluster 202 may include a hygrometer 204C for detection of humidity (i.e. water content) of the hydrogen stored in storage tank 50. The presence of humidity in stored hydrogen can affect the efficiency of energy production equipment such as PEM fuel cells. TMS 200 may alert stakeholders to potential issues. The HDOS 400 uses this information to output reliability ratings of producers (more specifically their storage tanks 50) and service recommendations which allow the storage vessel 50 owner to take action against leaks.

Sensor 4 (204D) Thermometers

Sensor cluster 202 will preferably include a thermometer 204D for monitoring temperature of hydrogen stored in storage tank 50. The pressure of a fixed mass of gas held at a constant volume is directionally proportional to its Kelvin temperature. Correspondingly, temperature along with pressure of the hydrogen in storage tank 50 with fixed volume can be used to calculate the quantity or mass of gas inside storage tank 50. Temperature is monitored as a verification on the pressure of a gas inside the tank 50. The HDOS 400 uses analysis of stored hydrogen temperatures to monitor pressure fluctuations based on temperature. If a sample of temperature does not correspond with the assumed pressure of the storage tank 50, the TMS 200 alerts the appropriate stakeholders that there might be a rupture or that a bleed-off might be required.

Sensor 5 (204E) Pressure Gauges

Sensor cluster 202 will preferably include a pressure gauge 204E or other suitable pressure sensor for monitoring pressure inside storage tank 50. As noted above, pressure and temperature allow for determination of the quantity of gas in storage tank 50. Pressure control allows for the efficient and responsible management of the supply chain. For mobile transportation vessel storage tanks, measuring the pressure of the tank 50 and comparing against other conditions allows for verification that the storage tank 50 remains intact and the hydrogen arrives to the consumer as expected. The pressure of the storage vessel is a baseline metric from which other sensor 204 data may be verified. The HDOS 400 calculates the pressure lost over time due to storage vessel issues & pressure fluctuation due to temperature allowing for the projection of levels upon delivery.

Sensor 6 (204F) GPS Transmitters

Sensor cluster 202 may include a GPS transmitter 204F for providing a location of storage tank 50. GPS transmitter 204F is preferably included in sensor cluster 202 for mobile storage tanks. GPS data indicative of the location of the storage tank 50 is assessed to provide metrics such as estimated time of delivery as well as to verify other conditions in the tank 50 as it travels. For example, GPS data indicating travel through mountainous regions may be correlated to fluctuations in temperature and pressure of the tank 50.

Sensor cluster 202 may also include mass flow sensors on inlet(s) and outlet(s) of storage tank 50 to directly measure quantities of gas transferred into and out of storage tank 50.

TMS 200 preferably comprises one or more microcontrollers. The microcontroller(s) are configured to collect data continuously or at regular periodic intervals so as to provide consistent relevant information to the HDOS 400 through the gateway 300. The microcontroller(s) involved with running the TMS 200 are responsible for collecting the conditions relayed by the sensors 204 through the gateway 300. Microcontroller(s) may also communicate information such as oxygen infiltration. Given the storage vessels are often exposed to a variety of conditions, the microcontroller(s) preferably are durable and rated to withstand temperature & weather conditions wherever the TMS 200 is deployed. Preferably, the microcontroller(s) are capable of relaying the measured conditions to the HDOS 400 through the gateway 300 by means of wireless communication 208 and preferably also offers a means of wired communication through IEEE Ethernet connectivity.

As indicated above the TMS 200 will be exposed to a variety of conditions and is preferably designed to withstand the ambient temperature and weather conditions wherever the TMS 200 is deployed. A combination of onboard and external sensors 204 may be applied based on specific tank configurations and may require connection through peripheral(s).

The TMS 200 is preferably capable of running under its own power and may be equipped with battery power sufficient to run for at least 1 year with regular intervals of conditional data sent to the HDOS 400 through the gateway 300.

The TMS 200 will be exposed to a variety of conditions and is preferably designed to withstand the ambient temperature and weather conditions wherever the system 200 is deployed. Microcontrollers and peripherals may be contained in a housing. The standard observed with the housing will preferably meet the criteria stipulated in IP68 rating to allow for continued function during exposure to dust, dirt, sand and minimal immersion in water. Functionality of TMS 200 is preferably sustained under conditions of temperature between −30° C. to 40° C. and the housing is preferably durable enough to withstand vibrations associated with moving the storage vessel during transportation.

Data Aggregation & Communication Gateway 300

A data aggregation and communication gateway 300 retrieves data from the TMS 200 and relays it to HDOS 400. Additionally, the gateway 300 relays data intended to support quality and quantity assessments and supply and demand predictions. In some embodiments, the gateway 300 compiles the data as communicated by the TMS 200 to be transmitted to the HDOS 400 via local and/or cellular networks 302 as immutable ledger entries on a blockchain system.

Figure 3:
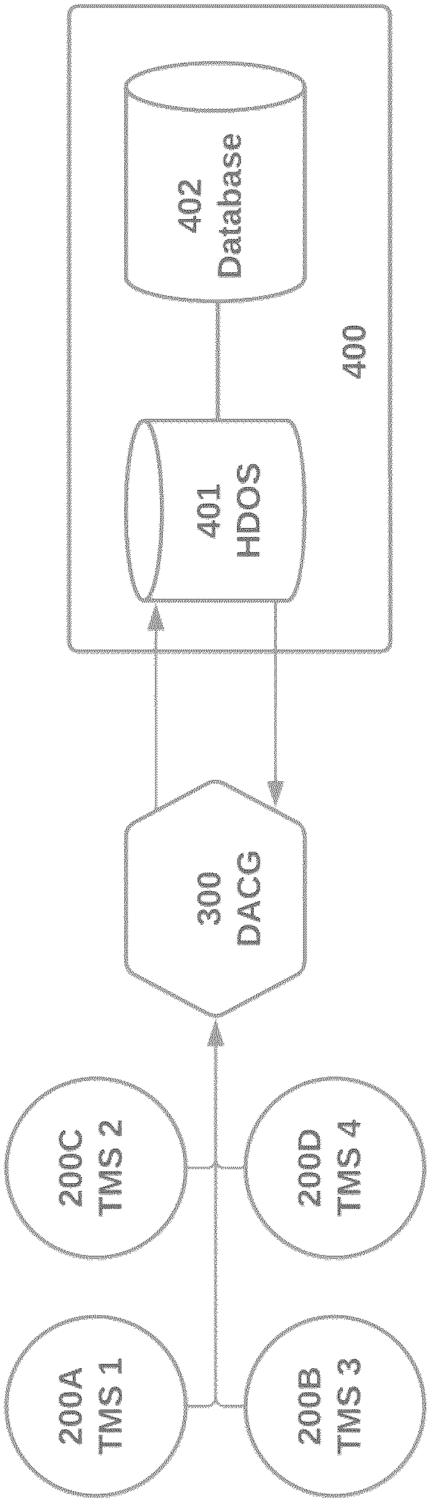
FIG. 3 is a schematic diagram of a data aggregation and communication gateway.

FIG. 3 is a schematic diagram of gateway 300. The functionality of the gateway 300 is intended to serve primarily as a communications array and secondarily as a cursory interrogation of data presented by the TMS 200. In an ideal embodiment of the invention the gateway 300 communicates wirelessly with the TMS 200 and relays it wirelessly to the HDOS 400. It can support a plurality of TMS modules, e.g. four TMS 200—TMS 200A, TMS 200B, TMS 200C, TMS 200D, and relay each packet in a batch to the HDOS 400 for the appropriate processing and depiction through the dashboard 500. Given the uncertain environmental conditions the gateway 300 will be deployed under the gateway 300 preferably should meet the same criteria mentioned above.

While gateway 300 is referred to as a separate subsystem herein, the skilled person will recognize that the functionality of the tank management system and the gateway can be combined in a single device. That is, a suitable computing device with communications capability, such as a suitably equipped single-board computer, may accomplish the functions of receiving sensor signals, converting those signals to data, aggregating the data from each sensor, and continuously or periodically broadcasting the aggregated data to HDOS 400.

Aggregation of the data presented to the HDOS 400 by the TMS 200 aids in managing the power available to the TMS 200, the lifetime between service instances & the cost(s) associated with transmitting the data to the HDOS 400 where local networks are unavailable. The gateway 300 is preferably capable of passively acquiring the TMS modules 200A, 200B, 200C, 200D within range and adding them to the overall system 100. gateway 300 gathers and interprets data packets committed by a plurality of TMS modules 200A, 200B, 200C, 200D, which can be reviewed locally even as the packets are relayed to the HDOS 400, preferably first by wireless communication (if available), by wired communication (if wireless is unavailable), or compiled locally until one of either wireless or wired communication becomes available.

As indicated above the gateway 300 will be exposed to a variety of conditions and is preferably designed to withstand the ambient temperature and weather conditions wherever the system 100 is deployed. Where it is not possible to communicate via wireless communication there is availability to connect through wired IEEE Ethernet.

The gateway 300 preferably should be capable of running under its own power and may be equipped with battery power sufficient to run for at least 1 year with regular intervals of conditional data sent to the HDOS 400.

The gateway 300 will be exposed to a variety of conditions and is preferably designed to withstand the ambient temperature and weather conditions wherever the system 100 is deployed. The standard observed with the housing of gateway 300 will preferably meet the criteria stipulated in IP68 rating to allow for continued function during exposure to dust, dirt, sand and minimal immersion in water. Functionality is sustained under conditions of temperature between −30° C. to 40° C. and the housing is preferably durable enough to withstand vibrations associated with moving the storage vessel during transportation.

Figure 4:
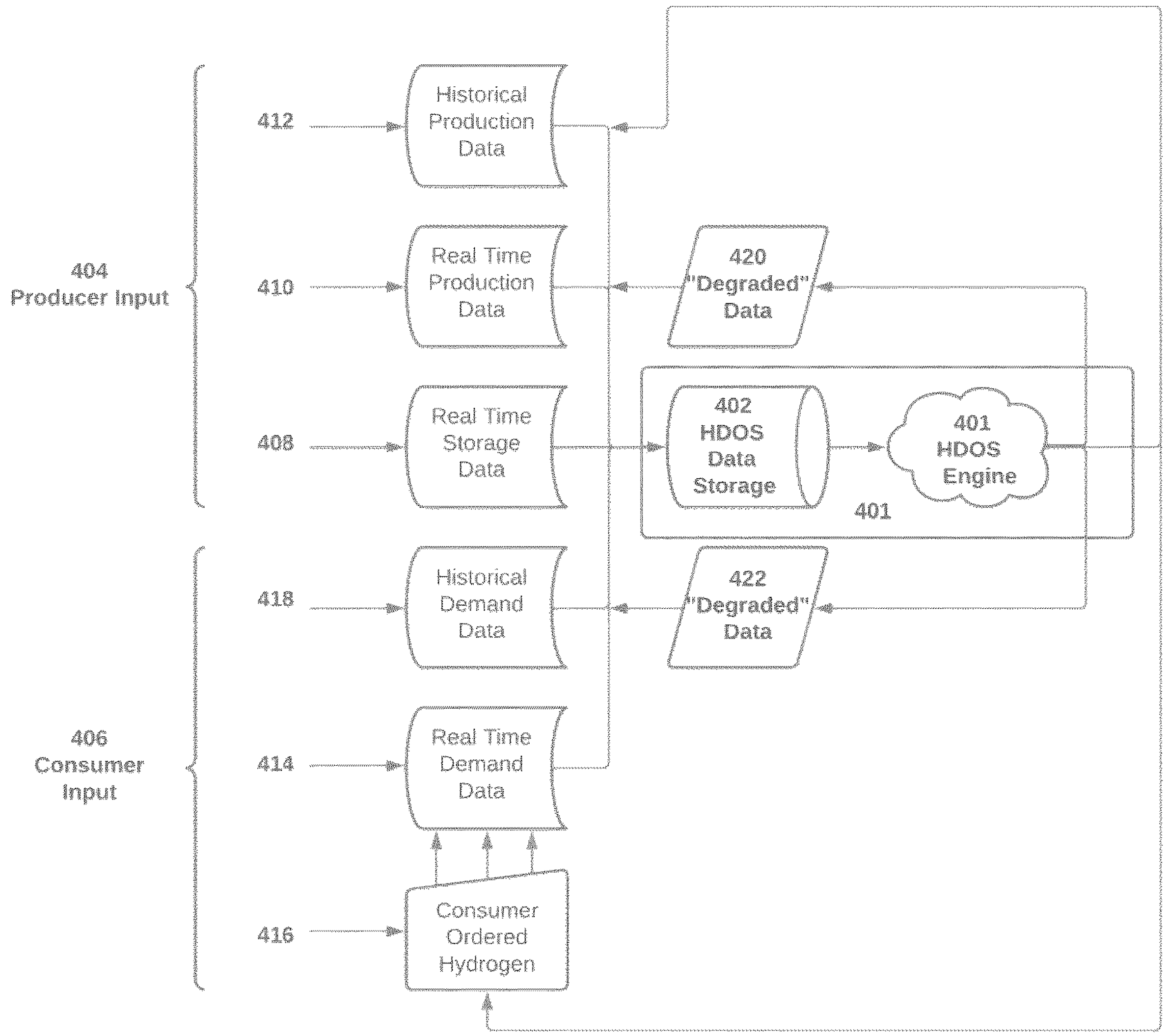
FIG. 4 is a schematic diagram of a hydrogen distribution sub-system.
Figure 5:
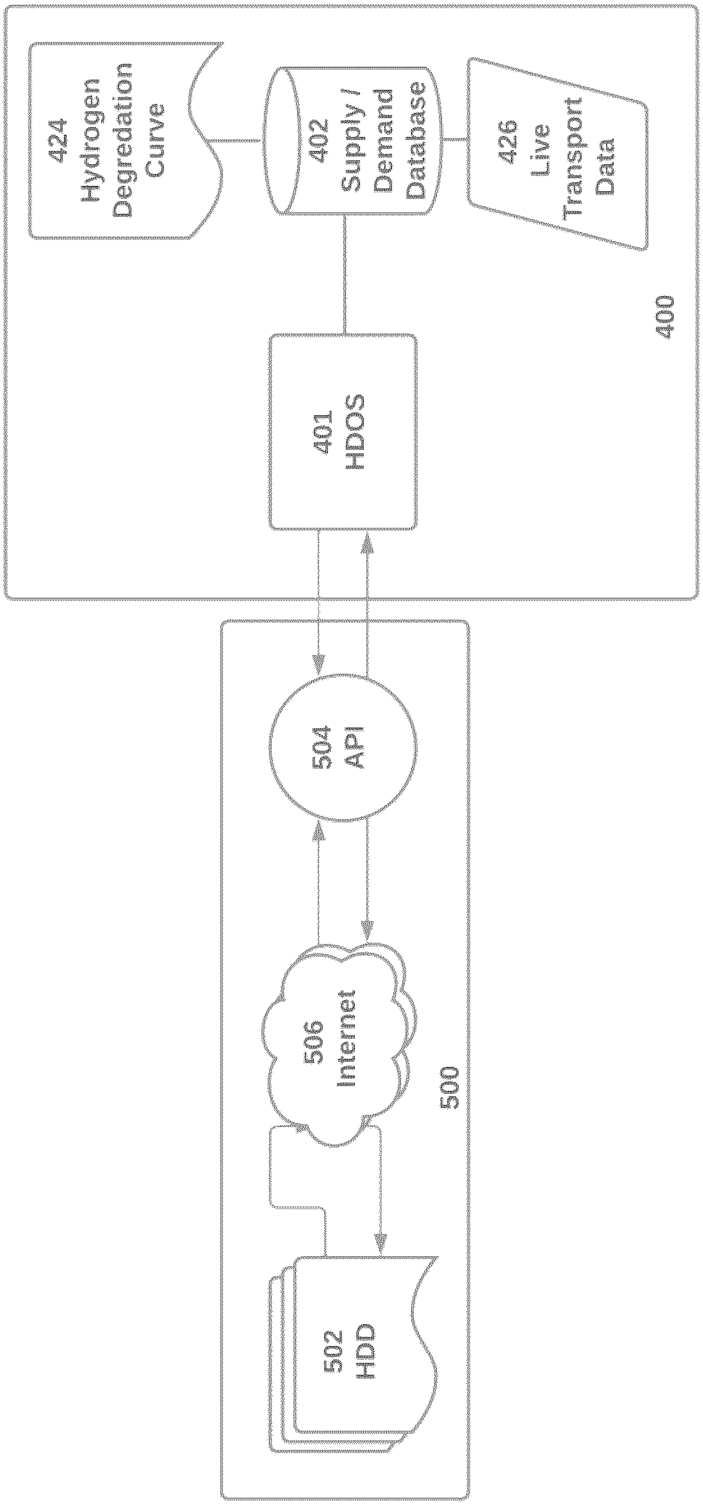
FIG. 5 is a schematic diagram of a hydrogen distribution dashboard.

FIG. 4 is a schematic diagram of the HDOS 400. As indicated in FIG. 5 a function of the Hydrogen Distribution Sub-System (HDOS) 400 is to receive the sensor packets and refinement data transmitted to HDOS 400 through the gateway 300 and prepare them for presentation to each stakeholder within the supply chain through the dashboard 500. HDOS 400 interprets sensor data packets to provide real-time/projected availability of hydrogen, present/future market demand, storage vessel integrity, hydrogen gas "lifetime" as determined by the system, and information to better understand the future storage, transportation and distribution of inventory. HDOS 400 may also output bills of lading, make logistical arrangements and otherwise govern the hydrogen inventory on the SHSD 100. The HDOS 400 also anticipates market demand using historical and projected inventories which triggers optional work orders for producers to meet upcoming demand for hydrogen. The HDOS 400 is also responsible for making calculations used to determine hydrogen "lifetime" (e.g. storage time at which the hydrogen remains above a certain purity calculated from the current purity and the hydrogen degradation tables or hydrogen degradation curve) hydrogen usability, storage vessel integrity, estimate delivery and arrange transportation. As gas chromatography (e.g. sensory data from sensors 204A, 204B) requires extensive and costly equipment; purity and impurity analysis becomes difficult to achieve in all tanks 50 across the supply chain. Accordingly, HDOS 400 is preferably configured to calculate a purity degradation table or curve from collected purity data. Where the chromatographs 204A, 204B are installed, they relay the purity information to the HDOS 400 and a database 402 of hydrogen purity, tank composition, tank age, other goods carried, number of draws of gas and number of deposits of gas is formed. From the collected purity data the lookup table is created, following which estimates on quality according to factors such as length of storage time can be applied throughout the rest of the supply chain.

The Hydrogen Distribution Sub-System (HDOS) 400 preferably comprises a cloud hosted application or engine 401 in communication with an HDOS database 402. HDOS database 402 receives data from TMS's 200 across the system via respective gateways 300. Such data is generally comprised of producer input data 404 and consumer input data 406. Producer input data 404 comprises real time storage data 408 of all available hydrogen within the supply chain, and current production data 410 and historical production data 412 available from manufacturing plants. Consumer input data 406 comprises real time demand data 414 as registered by end users via consumer hydrogen orders 416 and/or historic demand data 418, and (3) real time supply 408 based on current production data 410 and historical production data 412 volumes available from manufacturing plants. For stationary storage tanks, such as those at producers' operation sites, the location of the stationary tank may be added directly to database 402 and sensor packets from gateway 300 may be coded with identifying data to associate those packets with the location in database 402. Alternatively, the location can be encoded into sensor packets by associated with the stationary tanks by the gateway 300. Based on the aforementioned information, HDOS 400 functions in three domains: Real time optimization of storage levels, transportation and distribution required to manifest fulfilment over the next day/week/month. HDOS 400 communicates transport decisions to corresponding personnel/fleet/warehouse and sets real time demand presented by producers allowing the consumer to search for, verify and secure their hydrogen order 414 on the same platform. Lastly, the HDOS 400 receives and implements critical data to refine its speculative elements offered to end users.

HDOS Engine 401 may run various calculations on data aggregated in HDOS database 402. For example, HDOS Engine 401 may analyze real time storage data 408 against a degradation curve to produce a longevity measurement 420. Longevity measurement 420 may be communicated to producers (via dashboard 500) to allow for adjustment of future production accordingly. In another example, HDOS Engine 401 may assess real time storage data 408 against locations and time to delivery associated with historical demand data 418 and/or real time demand data 414 to provide a projected delivery purity 422 for consumer ordered hydrogen 416.

The HDOS 400 is preferably operated remotely on server infrastructure and accepts the sensor packets communicated to it by a plurality of TMS modules 200 through a plurality of gateway modules 300. The servers are optionally set in an elastic cloud configuration (ECC) which expands to offer the necessary processing capabilities whenever the data load relayed to it by the network requires it. An algorithmic combination of collected sensor packets, historical supply/demand data & available logistical arrangements is computed and stored on the server where it can be called up through the use of application programming interfaces (API's) and presented through unique panels tailored for each respective stakeholder in the supply chain as the dashboard 500. When a request is made through a consumer dashboard HDOS Engine 401 interrogates HDOS database 402 to seek producers of corresponding hydrogen gas. The resulting list of available hydrogen is fit to the consumer based on their use case for the hydrogen. Agreement (through use of the API) between the producer and consumer triggers the appropriate transportation, bills of lading and shipping manifests. HDOS Engine 401 will commit requests made to database 402 as a record of historical demand data for both the individual consumer as well as across the network, which can in turn be used to calculate predicted future demand, again for both the individual consumer as well as network-wide.

FIG. 5 is a schematic diagram of dashboard 500. It comprises a front-end dashboard 502 supported by application programming interface(s) (API) 504 that allows end-users to have mobile and timely feedback on the available hydrogen supply or demand based on the aggregated network data. The dashboard 500 displays the information relevant to each stakeholder in a comprehensive way that suits their role in the supply chain. A producer accesses current and projected market demand, a consumer accesses current supply and available production, a logistics company accesses producers/consumers posting bids for transportation and administrators see the complete network for troubleshooting purposes. In some embodiments utilizing the blockchain, each stakeholder has access to the ledger to ensure transparency and maintain integrity. Additional stakeholders are anticipated such as warehouse/storage sites. Those additional stakeholders may receive only storage vessel data and logistical arrangements through their dashboard.

Figure 6:
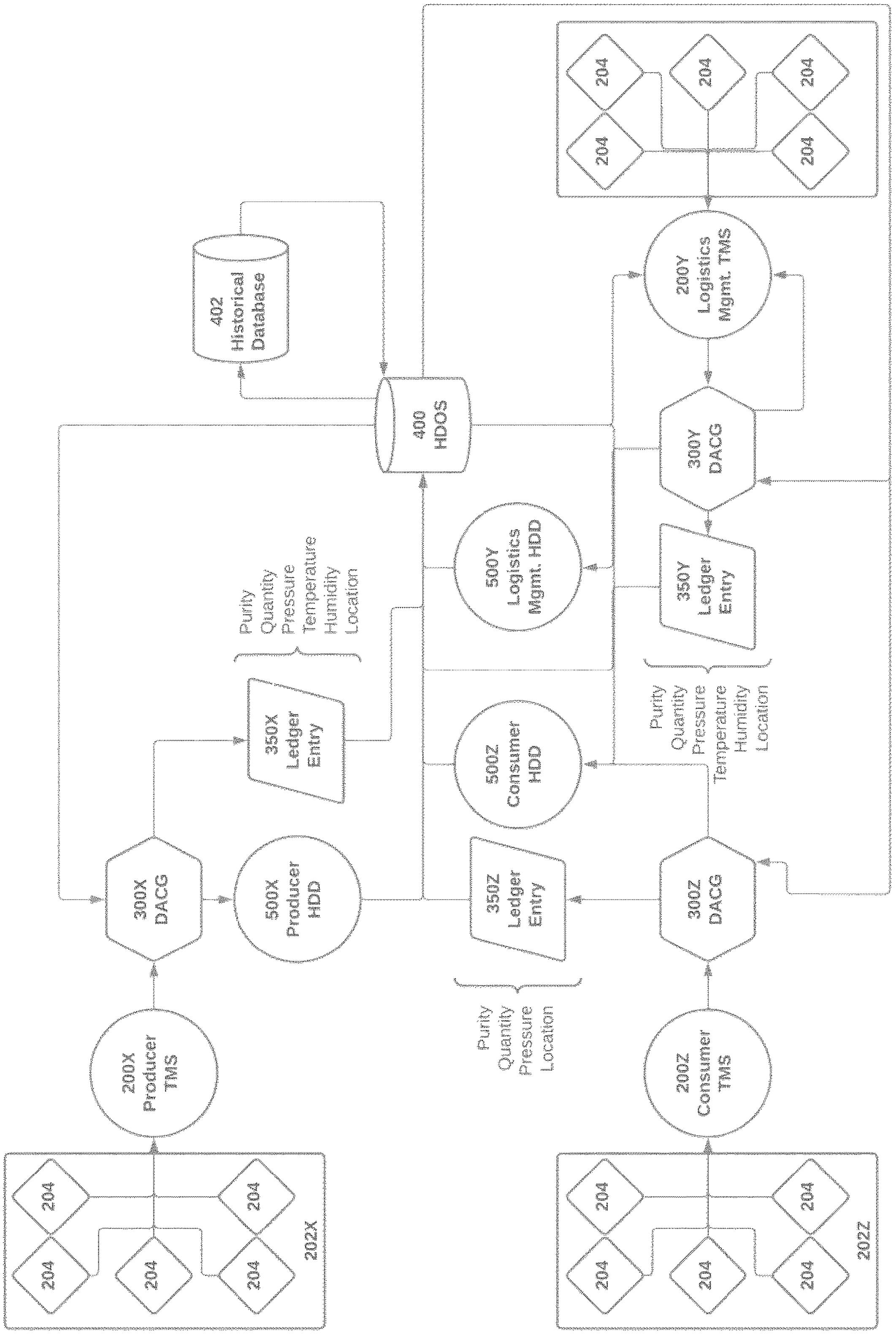
FIG. 6 is a schematic diagram of a hydrogen storage and distribution system having separate subsystems for a producer, a logistics and transportation manager, and a consumer.

The Hydrogen Distribution Dashboard (dashboard) 500 is the user facing application 502 where the details received and processed by the HDOS 400 are displayed according to the stakeholder relevance within the supply chain. Through the use of web 506 server(s) and API(s) 504 the dashboard 500 carries out all of the user centric processes by facilitating requests to the HDOS 400 for information to better carry out the user's role in the supply chain. FIG. 6 depicts the requests and responses served through API interface 504 which are run through functions of the HDOS 401 such as the Hydrogen Degradation Curve 424, Supply/Demand Database 402 or Live Transport Data 426. While the HDOS 400 processes the historical supply, demand, available transport & "shelf-life" of hydrogen the dashboard 500 depicts it for all users 502 on the platform.

The API 504 serves as a link between the plurality of user-facing dashboard's 502 and the centralized HDOS 400 to facilitate the requests of the users and depict the data relative to their involvement in the supply chain.

The dashboard 500 serves as the user interface for the invention and allows for information requested to be provided by the HDOS 400. End users cannot communicate directly with the TMS 200 or gateway 300 equipment and therefore interact solely with the dashboard 500. Local consumption or production figures are represented graphically vs. time for the user to better understand their relationship with the supply chain. Key performance indicators like loss due to ageing, storage vessel integrity or present impurity are visible to the user in the form of recommendation(s) for service or better management. If a user wants to address either their own or market needs they can leverage historical records to do so. Through the use of PID (Proportional Integral Derivative) functions the HDOS 400 can manage this over time to handle future needs based on refined historical data.

FIG. 6 is a schematic diagram of an SHSD 100' according to another embodiment. SHSD 100' comprises multiple subsystems or modules. In some embodiments, SHSD 100' comprises a producer module X associated with a particular producer, a logistics manager module Y associated with a particular logistics and transportation manager, and a consumer module Z associated with a particular consumer. Producer module X comprises a producer TMS 200X, a producer gateway 300X, and a producer dashboard 500X. logistics manager module Y comprises a logistics TMS 200Y, a logistics gateway 300Y, and a logistics dashboard 500Y. Consumer module Z comprises a consumer TMS 200Z, a consumer gateway 300Z, and a consumer dashboard 500Z. The skilled person will recognize that in other embodiments SHSD 100' can be scaled up to include modules for multiple producers, transporters, and/or consumers.

A producer sensor cluster 202X associated with one or more tanks owned by producer X sends sensor data to producer TMS 200X. Producer TMS 200X collates data from the one or more tanks and communicates the collated data to producer gateway 300X, which periodically aggregates the data into a producer sensor packet 350X that is transmitted to HDOS 400. Producer gateway 300X preferably also communicates the data to producer dashboard 500X so that producer X can monitor the status of its own tank(s) and hydrogen supply contained therein. Typically, producer TMS 200X and producer gateway 300X are located at producer X's operations (e.g. gasification plants, electrolysis plants, and the like), while HDOS 400 is hosted remotely. dashboard 500X may also be located at producer X's operations, or may be a network or browser-based application accessible from producer X's operations.

A logistics sensor cluster 202Y associated with one or more tanks owned by logistics manager Y sends sensor data to logistics TMS 200Y. logistics TMS 200Y collates data from the one or more tanks and communicates the collated data to logistics gateway 300Y, which periodically aggregates the data into a logistics packet 350Y that is transmitted to HDOS 400. Logistics gateway 300Y also communicates the data to logistics dashboard 500Y so that logistics manager Y can monitor the status of its own tank(s) and hydrogen supply contained therein. Typically, logistics TMS 200Y and logistics gateway 300Y are located at logistics manager Y's operations (e.g. a fleet of networked vehicle-based transportation tanks), while HDOS 400 is hosted remotely. Logistics dashboard 500Y may also be located at logistics manager Y's operations, or may be a network or browser-based application accessible from logistics manager Y's operations.

A consumer sensor cluster 202Z associated with one or more tanks owned by consumer Z sends sensor data to consumer TMS 200Z. Consumer TMS 200Z collates data from the one or more tanks and communicates the collated data to consumer gateway 300Z, which periodically aggregates the data into a consumer packet 350Z that is transmitted to HDOS 400. Consumer gateway 300Z also communicates the data to consumer dashboard 500Z so that consumer Z can monitor the status of its own tank(s) and hydrogen supply contained therein. Typically, consumer TMS 200Z and consumer gateway 300Z are located at consumer Z's operations (e.g. fuel cell refilling station), while HDOS 400 is hosted remotely. dashboard 500Z may also be located at consumer Z's operations, or may be a network or browser-based application accessible from consumer Z's operations.

HDOS 400 receives producer packets 350X, logistics packets 350Y, and consumer packets 350Z, and aggregates the packets 350 in database 402. dashboards 500 can then query database 402 via HDOS 400 to perform various functions.

For example, consumer Z can monitor its supply of hydrogen on consumer dashboard 500Z via consumer TMS 200Z and send a request for replenishment via dashboard 500Z to HDOS 400. HDOS 400 then reviews producer packets 350X to assess whether producer X has a hydrogen supply of sufficient quantity and purity to fulfill the request from consumer Z and, if so, sends a fulfillment request to producer dashboard 500X. Producer X can then choose to accept the fulfillment request via producer dashboard 500X, Acceptance by Producer X is sent to HDOS 400. HDOS 400 then queries logistics packets 350Y for logistics manager Y who is proximate to both producer X and consumer Z. If HDOS 400 determines that logistics manager Y has capacity to transport the requested quantity of hydrogen from producer X to consumer Z, HDOS 400 can send a transport request to logistics dashboard 500Y. Logistics manager Y can accept the transport request and dispatch a proximate transport vehicle to producer X to convey the requested hydrogen from producer X to consumer Z.

HDOS 400 can also analyze historical packets 350 stored in database 402 to forecast supply and demand across SHSD 100'. This supply and demand forecast may be sent to producer dashboard 500X so that producer X can adjust production rate of hydrogen to accommodate future demands.

These processes will now be described in further detail, beginning with consumer Z noting a need for additional hydrogen supply. During the consumer application on consumer dashboard 500X they note the use case for their hydrogen which the HDOS 400 correlates only to producers X with hydrogen meeting the conditions consumer Z requires. Through the accurate measurements of storage level, pressure, temperature, moisture level, location and quality/impurity of hydrogen by producer sensor cluster 202X being offered on the platform consumer Z can ensure that they receive only hydrogen that is relevant to their use case. First the hydrogen is analysed once it is produced and stored at the facility of origin of of producer X). In some embodiments, the "hydrogen state" is committed to an immutable producer ledger (e.g. a blockchain) where all relevant aspects of the gas are depicted in raw form which can be audited for transparency and confirmation of consistency. This hydrogen state may address the class of hydrogen (green, blue, grey, brown), pressure, GPS coordinates and (optionally) present purity/impurity. Each time hydrogen is stored, characteristics of the stored hydrogen are measured and a corresponding data packet is created. Quantities of stored hydrogen added and removed from tanks may be detected directly using mass flow sensors or in directly by measuring changes to temperature and pressure in the storage tank 50. The produced gas is preferably continuously sampled at regular interval(s) to verify purity. The data packets are transmitted and added to HDOS 400 where they are aggregated with all other sensor data packets on the network in database 402.

Once the HDOS 400 detects a request for hydrogen from Party Z (Consumer) the database 402 is interrogated by the HDOS Engine 401 to find the most appropriate hydrogen for the consumer Z given the amount of hydrogen, use case {i.e. required purity measured in "nines purity" (99.9%, 99.99%, 99.999%, 99.9999%)} distance to travel and logistical availability. The cost to the consumer Z is calculated algorithmically using the current market value of the gas, distance/time to travel, regional duties or taxes & other applicable fees. Once the consumer Z accepts the proposed shipment of hydrogen the required bill(s) of lading and shipping manifests are generated and the required transportation Party Y (Logistics Mgmt) is dispatched to the point of storage for the hydrogen (i.e. producer X). An additional final data packet is committed to the database 402 which encapsulates all of the confirmed details from Party X (storage facility) and awaits the acceptance from Party Z (i.e. consumer storage) of the shipped hydrogen.

In a preferred embodiment of the system 100' Party Y (the transporting truck) also has TMS 200Y equipped whereby the hydrogen is analysed for the entirety of its travel to the consumer Z. Where this cannot be arranged due to logistical limitations (e.g the truck fleet does not have TMS 200Y equipped) the hydrogen will be assessed upon delivery to Party Z (consumer storage) and an additional data packet will be committed to database 402 for comparing the hydrogen leaving Party X (storage facility) with the hydrogen delivered to Party Z (consumer storage). Any impurities accrued during transportation are accredited to Party Y (transporting truck) and accounted for on remuneration of Party Y.

In some embodiments, the HDOS 400 is in a constant state of calculation and might provision the hydrogen delivered from Party X to Party Z and potentially Party Z2, Z3, Z4 . . . (representing additional consumers) and so on (with the alternate Parties Y2, Y3, Y4, . . . representing additional logistical arrangements) so long as the remaining stored hydrogen satisfies the demands of Party Z. At each step of transfer of hydrogen between storage vessels, an additional data packet 350 may be committed to the database 402 for auditing transparency and efficiency. By applying these micro-logistical steps, the hydrogen extends its reach within the SHSD 100' and becomes available to more consumers Z2, Z3, Z4, . . . .

In another example embodiment, HDOS 400 may provide logistics support and routing for deliveries of a specified quantity and purity of hydrogen to consumers. For example, in an example SHSD supporting two producers X1, X2, a logistics manager Y1, and two consumers Z1, Z2, producer X1 may produce hydrogen having a purity P1 and producer X2 may produce hydrogen having a purity P2. Consumer Z1 may then submit a request R1 for a quantity of hydrogen Q1 at a purity P3, where P3 is less than or equal to P1. Consumer Z2 may then submit a request R2 for quantity of hydrogen Q2 at a purity P4, where P4 is less than P3.

HDOS 400 receives requests R1, R2 and may then direct logistics manager Y1 to dispatch a transportation vessel to receive a quantity of hydrogen Q3 from producer X1 (i.e. the transportation vessel will then contain quantity Q3 at purity P1), where quantity Q3 is equal to or greater than the sum of quantities Q1 and Q2. Since consumer Z1 requires higher purity hydrogen than consumer Z2, and since hydrogen purity typically degrades during storage and during storage tank filling and discharging operations, HDOS 400 routes the transportation vessel to deliver hydrogen to consumer Z1 first.

Following delivery of quantity Q1 of hydrogen to consumer Z1, the transportation vessel will now contain a quantity of hydrogen Q4 at a purity P5, where Q4 will be less than Q3 and P5 will typically be less than P1. Under normal operating conditions, quantity Q4 will be greater than or equal to quantity Q2 required by consumer Z2, and purity P5 will be greater than purity P4 required by consumer Z2. In those conditions, HDOS 400 will route the transportation directly to consumer Z2 for fulfillment of consumer Z2's request.

However, in some situations, for example if there are equipment malfunctions or operator errors during transportation or delivery of quantity Q1 to consumer Z1, quantity Q4 may be less than Q2 and/or purity P5 may be less than purity P4 required by consumer Z2. HDOS 400 can then calculate a quantity Q5 and purity P6 of hydrogen that needs to be added to the transportation vessel in order to meet consumer Z2's request. If producer X2 is located closer to consumer Z2 than producer X2, and if purity P2 is greater than or equal to purity P6, then HDOS 400 routes the transportation vessel to producer X2 for refilling before delivery to consumer Z2. On the other hand, if producer X1 is closer to consumer Z2 than producer X2, or if purity P2 is less than purity P6, HDOS 400 may route the transportation vessel back to producer X1 for refilling.

If, after delivery of hydrogen to consumer Z1, a third consumer Z3 makes a request for hydrogen of a quantity Q6 at a purity P7, where P7 is greater than purity P4 required by consumer Z2, HDOS 400 may re-route the transportation vessel to deliver to consumer Z3 first. If quantity Q4 of hydrogen in the transportation vessel is greater than or equal to the sum of Q2 and quantity Q6, HDOS 400 may route the transportation vessel to deliver to consumer Z2 after delivering to consumer Z3. However, if quantity Q4 is less than the sum of Q2 and Q6, then the HDOS 400 may request that logistics manager Y dispatch a second transportation vessel to producer X1 or X2 (whichever is closer to consumer Z2 and can meet consumer Z2's purity requirements) for fulfilling consumer Z2's requests.

The skilled person will recognize that the above described methods for distribution of hydrogen at varying quantities and purity requirements can be expanded to include more consumers, producers, and logistics manager than have been described here. For such expanded systems, HDOS 400 may group various consumers, producers and logistics managers by geographic proximity for efficiency in transportation times. However, if a consumer in a given geographic region makes a request for hydrogen at e.g. a purity that cannot be met by producers in that same geographic region, HDOS 400 may direct the request to producers and/or logistics managers in the next closest region who have the necessary purity available.

In some embodiments consumers may manually make requests for hydrogen. In some embodiments, HDOS 400 may provide semi-automatic or automatic resupply of hydrogen to consumers according to real-time storage data and or historic supply and demand data.

Figure 7:
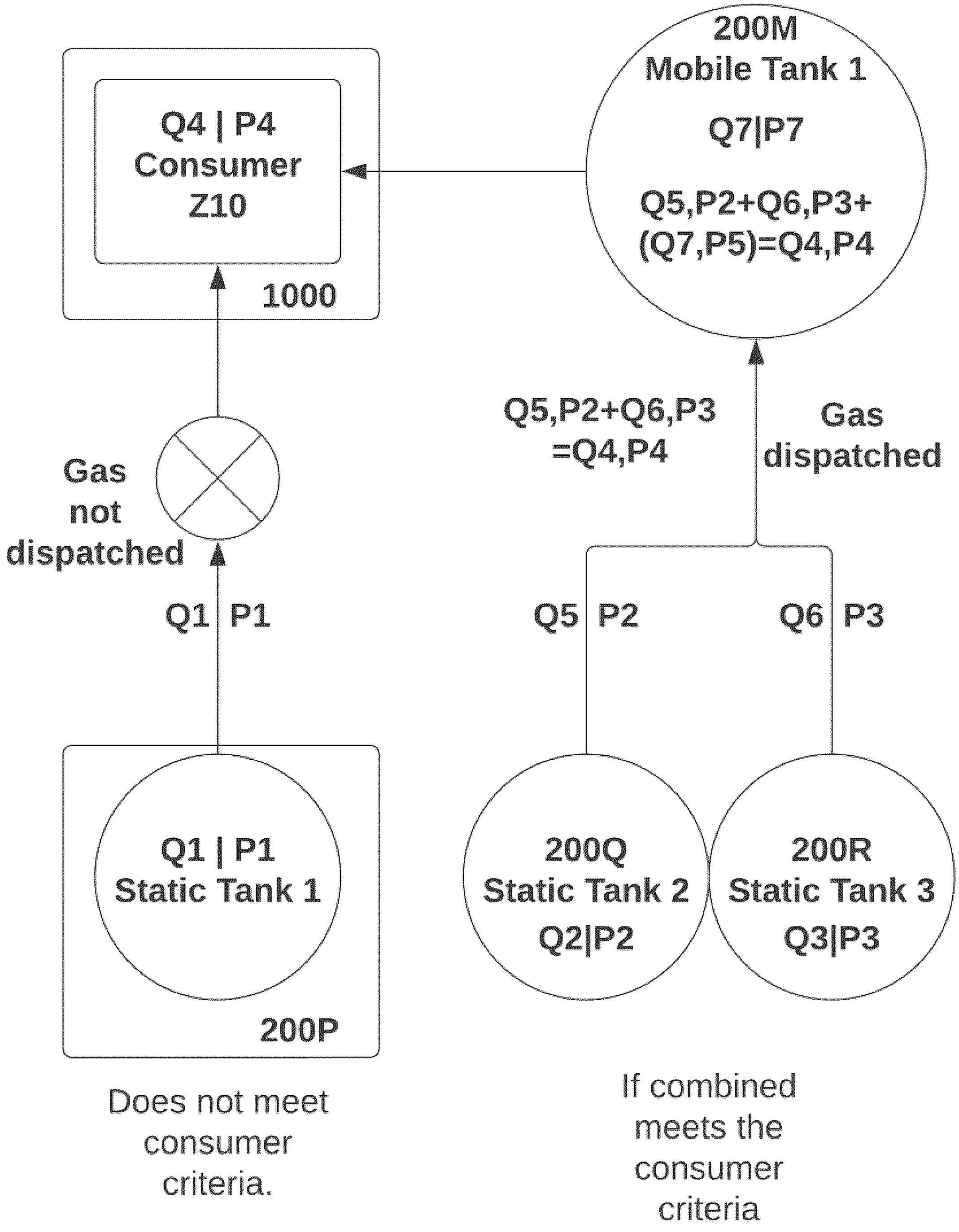
FIG. 7 is a schematic diagram of a decision tree illustrating selection of storage tanks for fulfilling consumer requests; and, FIG. 8 is a schematic diagram of a distribution system from a single producer to multiple consumers.

FIG. 7 shows an example decision process executed by HDOS 400 for an example geographical region. In this example geographical region, there is a first TMS 200P associated with a Static Tank 1, a second TMS 200Q associated with a Static Tank 2, and a third TMS 200R associated with a Static Tank 3. Static Tanks 1, 2, and 3 may each be tanks located at a producer facility, or may be bulk storage tanks at some intermediate supply depot, or some combination thereof.

TMS 200P sends data packets to HDOS 400 (not shown in FIG. 7) via a gateway 300 (not shown in FIG. 7) that indicate Static Tank 1 contains a first quantity Q1 of hydrogen at a first purity P1. TMS 200Q sends data packets to HDOS 400 that indicate Static Tank 2 contains a second quantity Q2 of hydrogen at a second purity P2. TMS 200R sends data packets to HDOS 400 that indicate Static Tank 3 contains a third quantity Q3 of hydrogen at a third purity P3.

A consumer Z10 sends a request 1000 to HDOS 400 via HDD 500 (not shown) for a fourth quantity Q4 of hydrogen at a fourth purity P4. P4 may be less than P1 and P2 but greater than P3. In some cases, consumer Z10 may indicate that they are willing to accept (and pay for) hydrogen at the higher purity P1 than requested. In those cases, HDOS 400 may route a Mobile Tank 1 to receive quantity Q4 at purity P1 from Static Tank 1, then route Mobile Tank 1 to deliver the quantity Q4 to consumer Z10 to fulfill request 1000.

In some cases, Static Tank 1 may not meet the requirements of request 1000. For example, quantity Q1 in Static Tank 1 may be less than quantity Q4 requested by consumer Z10, or Static Tank 1 may be too far away from consumer Z10 to fulfill request 1000 in the time specified by the consumer Z10. In these cases, based on the data packets received from TMS 200Q and TMS 200R HDOS 400 calculates a fifth quantity Q5 of hydrogen at second purity P2 and a sixth quantity Q6 of hydrogen at third purity P3 that, when combined, make up quantity Q4 and purity P4 requested by consumer Z10. HDOS 400 then routes Mobile Tank 1 to extract quantity Q5 from Static Tank 2, extract quantity Q6 from Static Tank 3, and deliver combined quantity Q4 to consumer Z10 to fulfill request 1000.

In many cases, Mobile Tank 1 already contains a seventh quantity Q7 of hydrogen at a fifth purity P5 at the time consumer Z10 sends request 1000. In some embodiments, the system includes a mobile tank management system TMS 200M associated with Mobile Tank 1. TMS 200M sends data packets indicating Q7 and P5. Quantity Q7 and purity P5 may also be calculated by HDOS 400 based on quantity and purity registered by another tank management system from the most recent time Mobile Tank 1 was filled or discharged. The calculated quantity and purity may be used to validate sensor data packets from TMS 200M or to substitute information where TMS 200M does not include a full sensor suite on board Mobile Tank 1 (for example no on-board gas chromatograph).

As discussed above, hydrogen purity may degrade during time in storage. Using data packets from each of Static Tanks 1, 2 and 3, received over time, HDOS 400 may calculate a hydrogen degradation rate for each of the Static Tanks 1, 2, and 3, Mobile Tank 1, as well as a global hydrogen degradation rate for all of the hydrogen stored in the system, and use these degradation rates to improve calculations in various ways.

In some cases, purity P1 is equivalent to purity P4 and so Static Tank 1 initially appears to be able to fulfill request 1000. However, using the distance between consumer Z10 and Static Tank 1 and the global hydrogen degradation rate, HDOS 400 may calculate that during transit from Static Tank 1 to consumer Z10 hydrogen at purity P1 may degrade to have a purity less than purity P4. In these cases, HDOS 400 will disqualify Static Tank 1 and route Mobile Tank 1 to Static Tanks 2 and 3 as previously described.

In some cases, HDOS 400 will calculate, using the global hydrogen degradation rate and the distances between Static Tanks 2 and 3 and consumer Z10, a transit degradation amount for Mobile Tank 1. The transit degradation amount can then be used to calculate modifications to quantities Q5 and Q6 so that quantity Q4 is delivered to consumer Z10 at the required purity P4, taking into account degradation in purity during transit.

The skilled person will readily recognize that this decision process may be scaled up to any number of consumers, static tanks, and mobile tanks.

Figure 8:
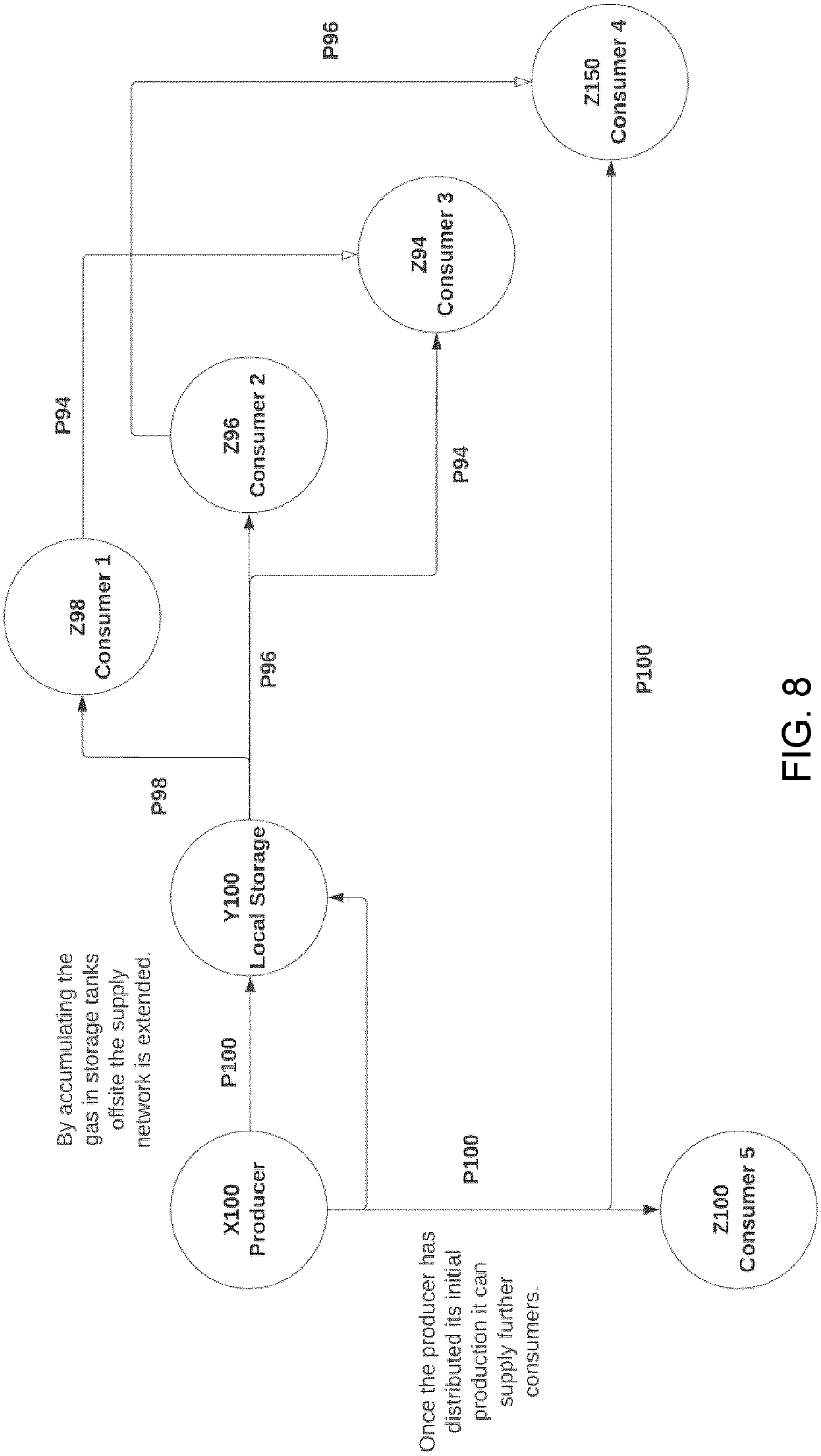

FIG. 8 is a schematic diagram depicting another example of use of hydrogen degradation curves calculated in the system to control distribution during inconsistent demand. A producer X100 produces hydrogen having a purity P100. A first consumer Z100 in the system may require hydrogen having purity P100, but consumer Z100 may need less quantity of hydrogen having purity P100 than producer X100 produces.

The system may further include a second consumer Z98 requiring hydrogen having a purity P98, a third consumer Z96 requiring hydrogen having a purity P96, and a fourth consumer Z94 requiring hydrogen having a purity P94, Where P100>P98>P96>P94. Based on degradation rates in the system, HDOS 400 can calculate storage time for hydrogen to degrade from purity P100 to purity P98 to purity P96 to P94. HDOS 400 can then route excess hydrogen from producer X100 to an offsite supply depot Y100. In the event that consumer Z100 requests additional quantities of hydrogen at purity P100, that hydrogen can be routed by HDOS 400 to consumer Z100 from either producer X100 or supply depot Y100, provided that hydrogen stored in supply depot Y100 has not yet degraded below purity P100.

If hydrogen stored at supply depot Y100 has been there for the storage time calculated by HDOS 400, HDOS 400 can begin to route quantities of hydrogen to fulfill requests made by consumer Z98, since the hydrogen at supply depot Y100 will now have degraded from purity P100 to purity P98. Similarly, once hydrogen has been stored at supply depot Y100 for longer, such that its purity has been calculated to have degraded to P96, HDOS 400 can begin routing quantities of hydrogen from supply depot Y100 to consumer Z96 who requires hydrogen at purity P96. Similarly, once hydrogen has been stored at supply depot Y100 for even longer, such that its purity has been calculated to have degraded to P94, HDOS 400 can begin routing quantities of hydrogen from supply depot Y100 to consumer Z94 who requires hydrogen at purity P94. In this way, excess hydrogen produced by producer X100 may be utilized across the system and producer X100 may at least partly recoup compensation for the hydrogen that might have otherwise been wasted due to degradation in purity.

If consumer Z98 has excess stock of hydrogen that has been stored long enough that it has degraded from requested purity P98 to P94 and is therefore no longer usable by consumer Z98, HDOS 400 can route that excess hydrogen to be delivered to consumer Z94. In this way, further excess hydrogen can be utilized in the system and consumer Z98 may at least partially recoup expenses incurred for the excess hydrogen it was not able to use.

The system may further include a fifth consumer Z150 who requires varying purities of hydrogen at different times. For example, consumer Z150 may periodically request quantities of hydrogen at purity P100, which can be fulfilled by HDOS 400 routing hydrogen to consumer Z150 directly from producer X100. Alternatively, HDOS 400 could route hydrogen from supply depot Y100 to consumer Z150, provided that the hydrogen stored at supply depot Y100 has not been there long enough for it to have degraded below purity P100. Consumer Z150 may periodically also request hydrogen at purity P96, and HDOS 400 could route excess hydrogen from consumer Z96 to consumer Z150 to fulfill that request. Alternatively, if hydrogen at supply depot Y100 has been stored long enough to degrade to purity P96, consumer Z150's request for hydrogen at purity P96 can be fulfilled by HDOS 400 from supply depot Y100.

By monitoring purity of hydrogen stored throughout the network over time, HDOS 400 can route hydrogen that has degraded such that it can no longer be used by a consumer for its original purpose to other consumers who request lower-purity hydrogen. In this way hydrogen is more fully utilized throughout the network and wasted hydrogen is minimized.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A method of distributing a gas, comprising:

recording over time, via a first sensor suite, sensor data representing a first purity of said gas stored in a first storage facility at a first location as a first series of data;

recording over time, via a second sensor suite, sensor data representing a second purity of said gas stored in a second storage facility at a second location as a second series of data, wherein said first purity and said second purity are not equal;

communicating, via a communications gateway, the first and second series of data to a distribution system;

receiving, via the distribution system, a request from a consumer party for a first quantity of said gas at a third purity, wherein the third purity is not equal to the first purity or the second purity;

calculating, via the distribution system, a second quantity of said gas at the first purity and a third quantity of said gas at the second purity that when combined are equal to said first quantity at the third purity;

routing, via the distribution system, a transportation vessel to the first storage location;

transferring said second quantity of said gas at said first purity into said transportation vessel from said first storage facility;

routing, via the distribution system, the transportation vessel from the first storage facility to the second storage facility;

transferring said third quantity of said gas at said second purity into said transportation vessel from said second storage facility, thereby combining said second quantity and said third quantity of said gas in said transportation vessel;

routing, via the distribution system, the transportation vessel from the second storage facility to the consumer; and delivering said first quantity of said gas at said third purity to the consumer.

2. The method according to claim 1, wherein the step of calculating includes:

calculating, via the distribution system, a purity degradation rate of said gas based on sequential decreases in said first purity in said first series of data and in said second purity in said second series of data;

calculating, via the distribution system:

a first travel time between said first storage facility and said second storage facility based on a distance between said first and second storage facilities; and a second travel time between said second storage facility and said consumer based on a distance between said second storage facility and said consumer;

calculating, via the distribution system, a transit degradation purity amount based on said purity degradation rate and said first and second travel times; and calculating, via the distribution system, the second quantity of said gas at the first purity and the third quantity of said gas at the second purity that when combined and are equal to said first quantity at the first purity plus the transit degradation purity amount.

3. The method according to claim 1, wherein the transportation vessel contains an initial quantity of said gas at an initial purity, and wherein the step of calculating includes:

calculating, via the distribution system, the second quantity of said gas at the first purity and the third quantity of said gas at the second purity that when combined with the initial quantity of said gas at the initial purity are equal to said first quantity at the first purity.

4. The method according to claim 1, the method including:

when the transportation vessel is located at the consumer, measuring, via a consumer sensor suite, a final purity of said gas in said transportation vessel and communicating said final purity to said distribution system; and calculating, via the distribution system, a transport vessel purity degradation rate for said transportation vessel based on the second purity, the final purity, and a travel time from said second storage facility to said consumer.

5. The method according to claim 1 wherein each sensor suite comprises one or more sensors selected from the group consisting of hygrometers, thermometers, mass flow sensors, spectrometers, gas chromatographs, oxygen sensors, pressure sensors, and GPS sensors.

6. A method of distributing a gas, comprising:

recording over time, via a first sensor suite, sensor data representing a first purity of said gas stored in a first storage facility at a first location as a first series of data;

recording over time, via a second sensor suite, sensor data representing a second purity of said gas stored in a second storage facility at a second location as a second series of data, wherein said first purity and said second purity are not equal;

communicating, via a communications gateway, the first and second series of data to a distribution system;

receiving, via the system, a request from a consumer party for gas at a third purity, wherein the third purity is not equal to the first purity or the second purity;

calculating, via the distribution system, from the first and second series of data, a volumetric or mass mixing ratio for combining said gas of said first purity with said gas of second purity so as to produce said gas at said third purity;

mixing quantities of said gas from said first storage facility with said gas from said second storage facility according to said mixing ratio to produce a resultant mixed gas at said third purity; and distributing said distributing said resultant mixed gas at said third purity to the consumer party.

7. The method of claim 6, wherein the step of calculating the mixing ratio comprises, via the distribution system:

calculating, from the first series of data, a first purity degradation rate;

calculating, from the second series of data, a second purity degradation rate;

inferring, from the first and second purity degradation rates, a third purity degradation rate for said gas at said third purity;

calculating a distribution time based on distances between said first location, said second location, and a location of said consumer party; and weighting the mixing ratio according to the distribution time and the third degradation rate.

8. The method of claim 6, wherein the mixing step takes place in an intermediary storage vessel.

9. The method of claim 8, wherein prior to the mixing step taking place, the intermediary storage vessel contains a residual quantity of said gas at a fourth purity;

And wherein the method further comprises:

measuring or inferring the residual quantity of said gas and the fourth purity;

communicating said measured or inferred residual quantity and fourth purity to said distribution system re-calculating, via the distribution system, from the first and second series of data and the residual quantity and fourth purity of gas in the intermediary storage vessel, a volumetric or mass mixing ratio for combining said gas of said first purity with said gas of second purity and said residual quantity of gas of the fourth purity so as to produce said gas at said third purity.

* * * * *